P. W. KANE.
PNEUMATIC CUSHIONING DEVICE.
APPLICATION FILED SEPT. 30, 1915.

1,226,673.

Patented May 22, 1917.

Witnesses:

Peter W. Kane
Inventor,
By ___ Atty.

UNITED STATES PATENT OFFICE.

PETER W. KANE, OF ROCHESTER, WASHINGTON, ASSIGNOR OF ONE-HALF TO EDWARD N. PEARCE, OF ROCHESTER, WASHINGTON.

PNEUMATIC CUSHIONING DEVICE.

1,226,673.   Specification of Letters Patent.   Patented May 22, 1917.

Application filed September 30, 1915. Serial No. 53,279.

*To all whom it may concern:*

Be it known that I, PETER W. KANE, a citizen of the United States, residing in the city of Rochester, county of Thurston, and State of Washington, have invented certain new and useful Improvements in Pneumatic Cushioning Devices, of which the following is a specification.

My invention relates to pneumatic cushioning devices, and more particularly to a device especially designed to operate as a shock absorber on automobiles, and the like, although it is to be understood, of course, that my invention can be used in other places where a cushioning action is required.

It is well known that when an automobile passes over a depression in the surface, or over a bump, that the occupants in the seats are frequently bounced off of the seats by the recoil action of the springs. One of the principal objects of my invention is to prevent this by catching and holding the bed, or body, of said automobile before the rebound action can take place, and to control the recoil action of the supporting springs in such a way that the bed, or body, of the automobile will gradually and yieldingly assume its normal position relative to the running gear of the machine.

In order that others may clearly understand my invention, I have shown one practical embodiment thereof on the accompanying sheet of drawings, on which I have illustrated its use as a shock absorber for an automobile, or the like.

Figure 2:
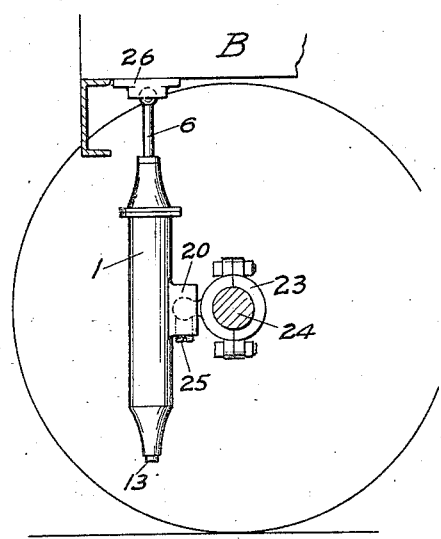
Figure 1:
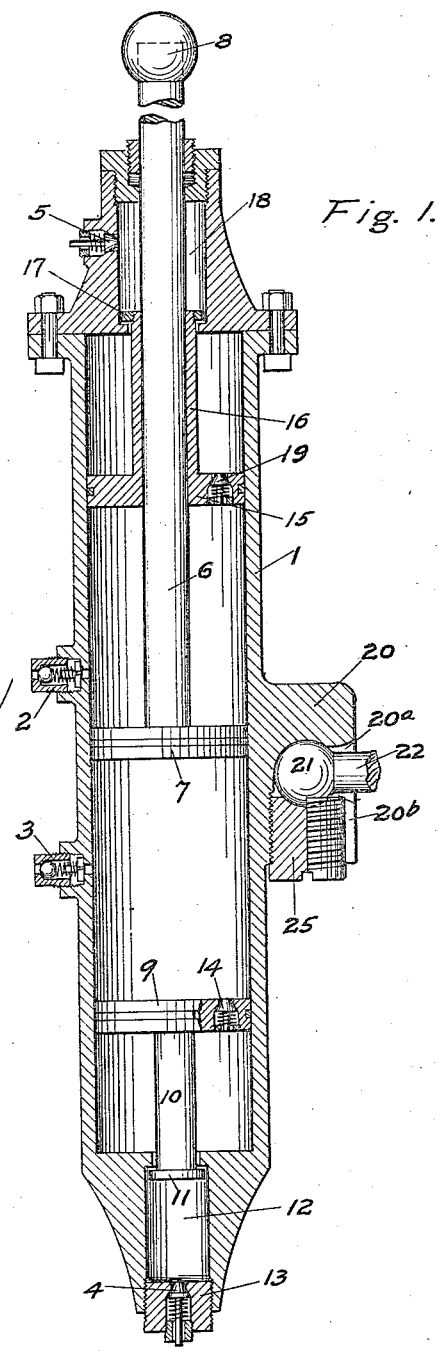

In the drawings, Figure 1 is a longitudinal, sectional view of the invention; and Fig. 2 is a view showing its application as a shock absorber on an automobile, only such portions of the automobile being shown as are necessary to show its application thereto.

Referring now more in detail to the drawings, my invention embodies a cylinder 1, provided with two intake check valves, 2 and 3, in its side, and two outlet check valves, 4 and 5, at or near its opposite ends. A piston rod 6, provided with a piston 7, is mounted within said cylinder, said piston rod projecting from one end thereof, and provided with a ball 8 at its end. Mounted in the opposite end of said cylinder, is a second piston 9, upon a short piston rod 10, provided at its outer end with a flange, or collar, 11, adapted to reciprocate within a recess 12, formed in the end of the cylinder, and from which recess, or chamber, 12, is the outlet check valve 4, mounted in a cap 13, as clearly indicated in Fig. 1. The piston 9, is provided with a passage therethrough controlled by check valve 14. At the opposite, or upper, end of said cylinder 1, is a third piston 15, upon a hollow piston rod, or sleeve, 16, provided at its opposite, or upper, end with a detachable ring, or collar, 17, working in a recess, or chamber, 18, formed in the end portion, or cap, of the cylinder 1, as clearly indicated. From this chamber is an outlet opening controlled by the check valve 5. The piston rod 6, of the main piston 7, operates through the hollow piston rod, or sleeve, 16, of the piston 15. The piston 15, is provided with an opening therethrough, controlled by a check valve 19. It will be noted that this check valve 19, operates in the same direction as does the check valve 14, in the piston 9.

The cylinder 1, when used as a shock absorber, is provided on its side with a supporting lug, or block, 20, having a socket formed therein, adapted to receive a ball 21, upon a supporting stem 22, formed upon a collar 23, adapted to be clamped around an axle 24, of the vehicle. A screw plug 25, provided with a concaved end, is screwed into the lug 20, as clearly shown in the drawings, for the purpose of holding the ball 21, within the socket formed in the lug 20. Said lug 20, is cut away, as at 20$^a$, so as to permit a certain movement of the cylinder 1, relative to the axle 24. In order to insert said ball 21, and stem 22, into place, a slot 20$^b$, corresponding in breadth to the diameter of the stem 22, is provided in the lug 20. This forms a ball and socket, or universal, joint between the supporting means upon the axle 24, and the cylinder 21. A ball and socket joint is also provided between the upper end of the main piston rod 6, and a block 26, secured to the bed, or body, B, of the vehicle.

The operation of the device may be briefly described as follows:

Assuming that the cylinder 1, is mounted upon the axle 24, with the main piston rod 6, attached to the bed, or body, of an automobile, as illustrated in Fig. 2, any downward movement of the bed, or body, B, will operate to move the piston 7, downwardly in the cylinder 1. This movement operates to compress the air in the cylinder 1, below the piston 7, thus also forcing the piston 9 downwardly, and at the same time forcing some of the air which is between pistons 7 and 9 through the piston 9, at the valve 14, while the air which is below the piston 9, is forced slowly around the piston rod 10, into the chamber 12, in the lower end of the cylinder, and out through the valve-controlled outlet at 4. Valves 4 and 5 are held closed by springs whose tensions can be regulated, in a manner clearly illustrated in the drawing. During the downward movement of the piston 7, the air can enter the cylinder through the inlet check valve 2. The upper piston 15 will also move downwardly, following the piston 7, under the action of the air in the cylinder above the piston 15, and in the chamber 18, in the upper end of the cylinder 1. Thus there is a yieldingly, retarded movement of the bed, or body, downardly. Instead of the bed, or body, springing up quickly, or rebounding, in the usual manner under the recoil action of its supporting springs, it is prevented from so doing by the action of the pistons 7 and 15, in the cylinder 1, for it will be noted that as soon as the piston 7 starts upwardly, the inlet check valve 2, is closed against the escape of air from the cylinder, as is also the check valve 19, in the piston 15, so that the piston 15, will also be moved upwardly forcing the air above the same out around its hollow rod 16, into the chamber 18, and out through the outlet check valve 5. The air between the piston 15, and the piston 7, operates to yieldingly hold the piston 7, against a full upward movement.

Thus it will be seen that I have provided a main plunger, or piston, with two opposed plungers, or pistons, coöperating therewith, in opposite ends of the same cylinder, whereby the movement of the main plunger, or piston, 7, is yieldingly retarded in its movement in either direction.

I am aware that changes can be made in the invention as here embodied for purposes of illustration, without departing from the spirit thereof, and I do not, therefore, limit the invention to the particular form thereof here shown, except as I may be limited by the hereto appended claims.

I claim:

1. In a device of the character described, a cylinder, a piston working therein, valve-controlled inlet openings for alternately admitting air to said cylinder at opposite sides of said piston as it is moved alternately in opposite directions, an auxiliary piston within said cylinder and operating at one side of said first piston, and a check valve-controlled opening in said second piston, whereby to permit air to be forced therethrough in one direction.

2. In a device of the character described, a cylinder with piston working therein, valve-controlled inlet openings for alternately admitting air to said cylinder at opposite sides of said piston as it is moved alternately in opposite directions, two auxiliary pistons within said cylinder at the opposite sides of said first piston, and a valve-controlled opening through each of said auxiliary pistons, whereby to permit air to be forced therethrough in one direction.

3. In a device of the character described, a cylinder with supporting means therefor, a piston with piston rod working therein and adapted to be connected to a relatively movable member, valve-controlled inlet openings for alternately admitting air to said cylinder at opposite sides of said piston as it is moved alternately in opposite directions, and one or more auxiliary pistons movably mounted within said cylinder and provided with valve - controlled openings therethrough, said auxiliary pistons being adapted to coöperate with said main piston for controlling the movement of said main piston within said cylinder.

4. A device of the character described comprising a cylinder provided with means for movably supporting the same, a piston with piston rod therein, adapted to be connected with a member movable relative to said cylinder, said cylinder being provided with valve-controlled inlet and outlet openings, and one or more auxiliary pistons operating within said cylinder and adapted to be moved by said main piston, said auxiliary pistons being provided with valve-controlled openings therethrough, whereby to permit the passage of air therethrough in one direction, substantially as described.

5. A cushioning device of the character shown and described, comprising a cylinder provided with means for supporting the same, and having valve-controlled inlet openings spaced apart longitudinally thereof, and also having valve-controlled outlet openings at the opposite ends thereof, a piston and piston rod working in said cylinder and adapted to be connected with a member movable relative to said cylinder, and one or more auxiliary pistons within said cylinder and adapted to coöperate with said main piston, said auxiliary pistons having valve-controlled openings therethrough, whereby to permit air to pass therethrough in one direction, substantially as described.

6. A cushioning device of the character shown and described, comprising a cylinder having separate recesses in its opposite ends communicating with the interior thereof and provided with valve-controlled inlet openings in its side, and valve-controlled outlet openings from said recesses at its opposite ends, a main piston with piston rod working in said cylinder, an auxiliary piston with sleeve slidably mounted upon said piston rod within said cylinder, said sleeve having a part operating in said separate recess at one end of said cylinder with means for limiting its movement longitudinally of said cylinder, and a second auxiliary piston in said cylinder at the opposite side of said main piston and having a short piston rod moving in said recess at that end of said cylinder, with means for limiting its movement longitudinally of said cylinder, said auxiliary pistons being provided with valve-controlled passageways therethrough, whereby to permit the passage of air therethrough in one direction, substantially as described.

7. A cushioning device adapted to be connected between two bodies movable relative to each other, comprising a cylinder provided with means for pivotally connecting it to one of said bodies, a piston working therein with piston rod adapted to be pivotally connected to the other of said moving bodies, two auxiliary pistons working in said cylinder at opposite sides of said main piston and provided with valve-controlled passageways therethrough, and valve-controlled air inlets and outlets for controlling the action of the air as said pistons are moved within said cylinder, substantially as described.

Signed at Portland, Multnomah county, Oregon, this 14 day of September, 1915.

PETER W. KANE.

In presence of—
  I. M. GRIFFIN,
  J. C. STRENG.